United States Patent
Sato et al.

(10) Patent No.: US 6,529,792 B1
(45) Date of Patent: Mar. 4, 2003

(54) PROCESS EQUIPMENT SELECTING SYSTEM AND METHOD FOR SELECTING PROCESS EQUIPMENT

(75) Inventors: Yasuhiro Sato, Tokyo (JP); Masaki Otani, Tokyo (JP); Takamasa Inobe, Tokyo (JP); Katsuya Ota, Tokyo (JP); Yasuhiro Marume, Hyogo (JP); Ryuji Takechi, Hyogo (JP); Kenji Sakaguchi, Hyogo (JP); Toshiyuki Watanabe, Hyogo (JP)

(73) Assignees: Mitsubishi Denki Kabushiki Kaisha, Tokyo (JP); Ryoden Semiconductor System Engineering Corporation, Hyogo (JP)

( * ) Notice: Subject to any disclaimer, the term of this patent is extended or adjusted under 35 U.S.C. 154(b) by 0 days.

(21) Appl. No.: 09/576,228

(22) Filed: May 22, 2000

(30) Foreign Application Priority Data

Dec. 3, 1999 (JP) .......................... 11-345418

(51) Int. Cl.$^7$ .................. G06F 19/00; H01L 21/00
(52) U.S. Cl. .................. 700/121; 700/99; 700/103; 438/5
(58) Field of Search ............... 700/97, 99, 100, 700/103, 121; 438/5

(56) References Cited

U.S. PATENT DOCUMENTS

| | | | | |
|---|---|---|---|---|
| 5,440,493 A | * | 8/1995 | Doida | 700/99 |
| 5,446,669 A | * | 8/1995 | Yamashita et al. | 700/100 |
| 5,625,560 A | * | 4/1997 | Kikuchi | 700/103 |
| 5,862,050 A | * | 1/1999 | Toyota | 700/100 |
| 6,192,291 B1 | * | 2/2001 | Kwon | 118/663 |
| 6,201,999 B1 | * | 3/2001 | Jevtic | 118/719 |
| 6,341,240 B1 | * | 1/2002 | Bermon et al. | 700/97 |
| 6,400,999 B1 | * | 6/2002 | Kashiyama et al. | 700/100 |
| 6,415,192 B1 | * | 7/2002 | Satoguchi | 700/121 |

FOREIGN PATENT DOCUMENTS

JP 9-260231 10/1997

* cited by examiner

Primary Examiner—Leo Picard
Assistant Examiner—Elliott Frank
(74) Attorney, Agent, or Firm—McDermott, Will & Emery

(57) ABSTRACT

A process selection system and method enable the automatic control of the specification to equipment most suitable for each lot. Processing using this specific equipment can be performed by further selecting the most suitable equipment from equipment used for the product type. Since a plurality of equipment can be specified for each lot, the equipment can be specified from an equipment group having these plurality of equipment. The adequate number of products in process for each equipment-specific process equipment id can be calculated based on the distribution percentage ri. The equipment-specific process equipment having the maximum value of the differential Gi between the adequate number of products in process ni and the collected actual number of products in process can be determined as the equipment-specific process equipment for the lot.

20 Claims, 10 Drawing Sheets

F I G. 6
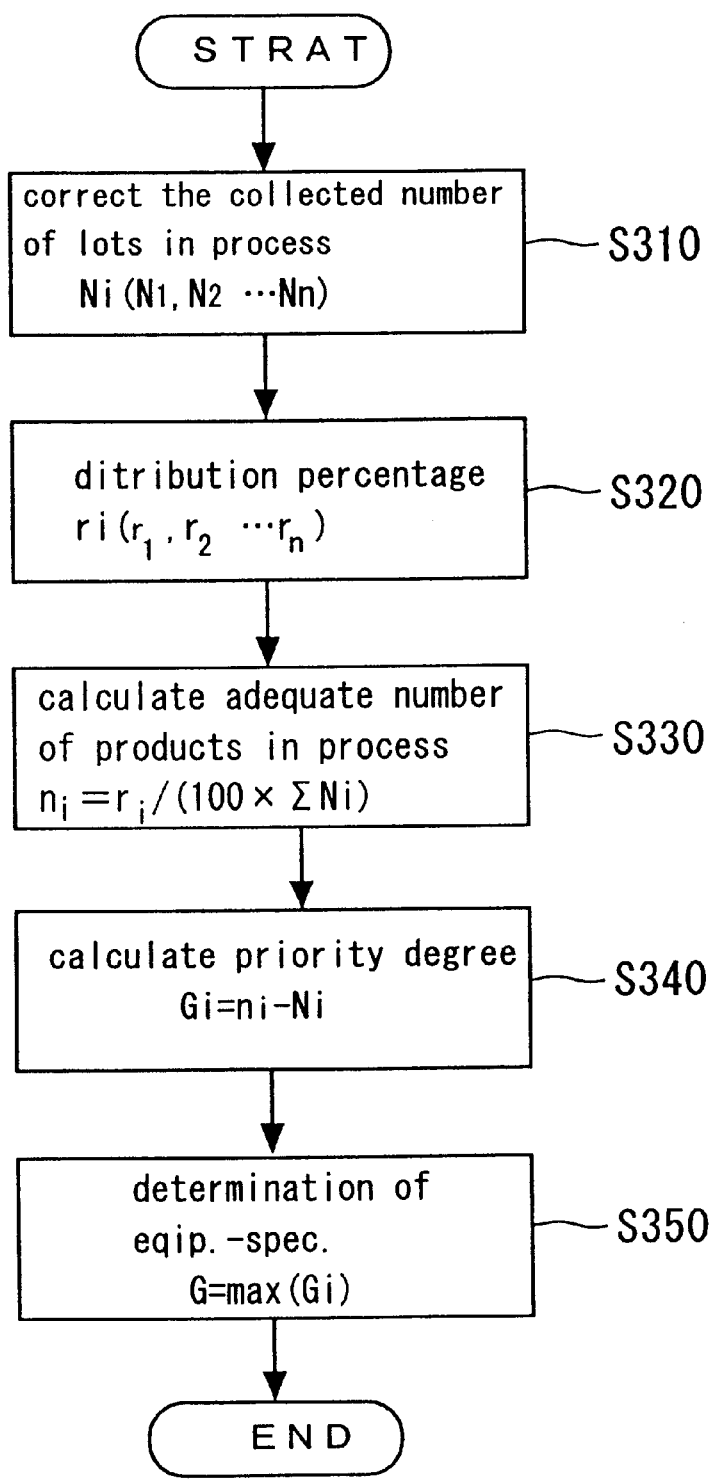

FIG. 8

| type | eqip.-spec group name | | usable eqip. id | ditrib. % | result |
|---|---|---|---|---|---|
| | elem. id | eqip.-spec.proc. eqip. id | | | |
| AAA | GA | EQPGA1 | EQP11, EQP14 | 33 | 20 |
| AAA | GA | EQPGA2 | EQP12 | 33 | 20 |
| AAA | GA | EQPGA3 | EQP13 | 33 | 19 |
| AAA | GB | EQPGB1 | EQP01, EQP02 | 50 | 5 |
| AAA | GB | EQPGB2 | EQP03, EQP04 | 50 | 4 |
| AAA | GC | EQPGC1 | EQP21, EQP23, EQP25 | 60 | 0 |
| AAA | GC | EQPGC2 | EQP22, EQP24, EQP26 | 40 | 0 |
| DDD | GA | EQPGD1 | EQP21 | 25 | 4 |
| DDD | GA | EQPGD2 | EQP22 | 25 | 3 |
| DDD | GA | EQPGD3 | EQP23 | 25 | 3 |
| DDD | GA | EQPGD4 | EQP24 | 25 | 3 |
| DDD | GB | EQPGE1 | EQP01, EQP02 | 50 | 7 |
| DDD | GB | EQPGE2 | EQP03, EQP04 | 50 | 7 |

90

PRIOR ART

PROCESS EQUIPMENT SELECTING SYSTEM AND METHOD FOR SELECTING PROCESS EQUIPMENT

BACKGROUND OF THE INVENTION

1. Field of the Invention

The present invention relates to a process equipment selecting system and a method for selecting process equipment, and more specifically to a system and a method for selecting manufacturing equipment or process equipment which selects equipment most suited for each process in the production line requiring particularly high precision processing.

2. Description of Related Art

In photoengraving processes for semiconductor devices, different properties, such as registration accuracy, may be resulted depending on process equipment used for processing, even when the semiconductor devices are processed under the same process conditions. Heretofore, when products requiring registration accuracy between photoengraving processes are produced, the processes requiring registration accuracy has had to be processed only by the same equipment or by equipment within a equipment group having the same properties. The control of these fixed processes, equipment or equipment groups requiring registration accuracy has been performed manually. Dimensional accuracy of photoengraving or dimensional accuracy of etching require similar highly precision processing.

FIG. 9 shows the relationship between the process and equipment used in a conventional production factories. In FIG. 9, the master table (process master able) 100 for defining the order of processes required for the production of products (hereafter referred to as "lot") contains the process id identifying the order of processes, and the process equipment id identifying groups containing one or more unit of equipment usable corresponding to the process id. For example, the process id is defined in the order of "process 1," "process 2," and "process 3," and the process equipment id corresponds to each process id, and is defined as the process equipment corresponding to "process 1" is "EQPG1." The process equipment table 120 defines the process equipment id and the equipment id contained in the group of the relevant process equipment id. The process equipment table 120 defines one or more equipment id corresponding to the process equipment id, and equipment identified by these equipment ids is equipment usable for actual processing in each process. In conventional production factories, the equipment id used in a certain process id is determined by executing the computer program 130 for retrieving equipment using the above-described process master table 100 and the process equipment table 120.

FIG. 10 is a flowchart showing a conventional equipment retrieving process for obtaining equipment which can be used for processing in the next process step when a certain process step of a lot has completed and proceeds to the next process step. As FIG. 10 shows, the process master table 120 for the lot is first retrieved to acquire the process equipment id of the lot type usable for the next process id (Step S510). The process equipment table 120 is retrieved to acquire the equipment id corresponding to the process equipment id acquired in Step S510 (Step S520). A unit of equipment is selected from one or more equipment id acquired in Step S520, and the lot is actually processed by the selected equipment (Step S530).

In order to achieve the improvement of quality or accuracy of a lot, equipment used for processing must be limited, especially when process accuracy is required. However, in conventional method for selecting process equipment, since a unit of equipment is selected from a group of equipment usable for processing a type of the product as described above, equipment most suited for each lot has not been able to be selected. When a limited unit of equipment usable for processing is selected, the equipment cannot be substituted when it cannot be used due to failure or the like, which becomes a critical interference for the production of the lot.

SUMMARY OF THE INVENTION

Therefore, the object of the present invention is to provide the solution of the above-described problems, and to provide a system and a method for selecting processes, which enable a type of lot to be processed by any unit of a plurality of units of equipment, but automatically control the selection of the most suited equipment when processing with a limited unit of equipment most suited for each lot is required.

According to a first aspect of the present invention, there is provided a process equipment selection system for selecting process equipment for each lot, comprising: a process master control means for controlling the order of process steps producing the lot, together with a process equipment group including at least one unit of equipment used for the process, a control type showing whether or not the specification of process equipment used for the process is controlled, and an element process that the process can include; a lot information control means for controlling an equipment-specific process equipment group including at least one unit of process equipment used for element process for each lot and the element process of the lot; and a equipment-specific process equipment control means controlling the process equipment included in equipment-specific process equipment group for each of the equipment-specific process equipment groups, wherein when the control type of the process master control means indicates controlling the specification of process equipment for producing the lot, an equipment-specific process equipment group specifically used is acquired from the lot information control means, and the process equipment included in the equipment-specific process equipment group is selected from the equipment-specific process equipment control means.

According to a second aspect of the present invention, there is provided a method for selecting process equipment in a process equipment selection system for selecting process equipment for each lot, the process equipment selection system comprising: a process master control portion for controlling the order of process steps producing the lot, together with a process equipment group including at least one unit of equipment used for the process, a control type showing whether or not the specification of process equipment used for the process is controlled, and an element process that the process can include; a lot information control portion for controlling an equipment-specific process equipment group including at least one unit of process equipment used for element process for each lot and the element process of the lot; and an equipment-specific control means controlling the process equipment included in equipment-specific process equipment group for each of the equipment-specific process equipment groups, the method for selecting process equipment comprising: an equipment-specific process equipment acquiring step for acquiring an equipment-specific process equipment group specifically used from the lot information control portion, when the control type of the process master control portion indicates controlling the specification of process equipment for producing the lot; and a selection step for selecting the process equipment included in the equipment-specific process equipment group acquired by the equipment-specific process equipment acquiring step from the equipment-specific process equipment control portion.

The above and other objects, effects, features and advantages of the present invention will become more apparent from the following description of the embodiments thereof taken in conjunction with the accompanying drawings.

BRIEF DESCRIPTION OF THE DRAWINGS

FIG. 6 shows a method for determining equipment-specific process equipment id according to Embodiment 3 of the present invention.

FIG. 8 shows a method for displaying usable equipment ids or the like for each equipment-specific group in Embodiment 5 of the present invention.

DETAILED DESCRIPTION OF THE PREFERRED EMBODIMENTS

Figure 1:
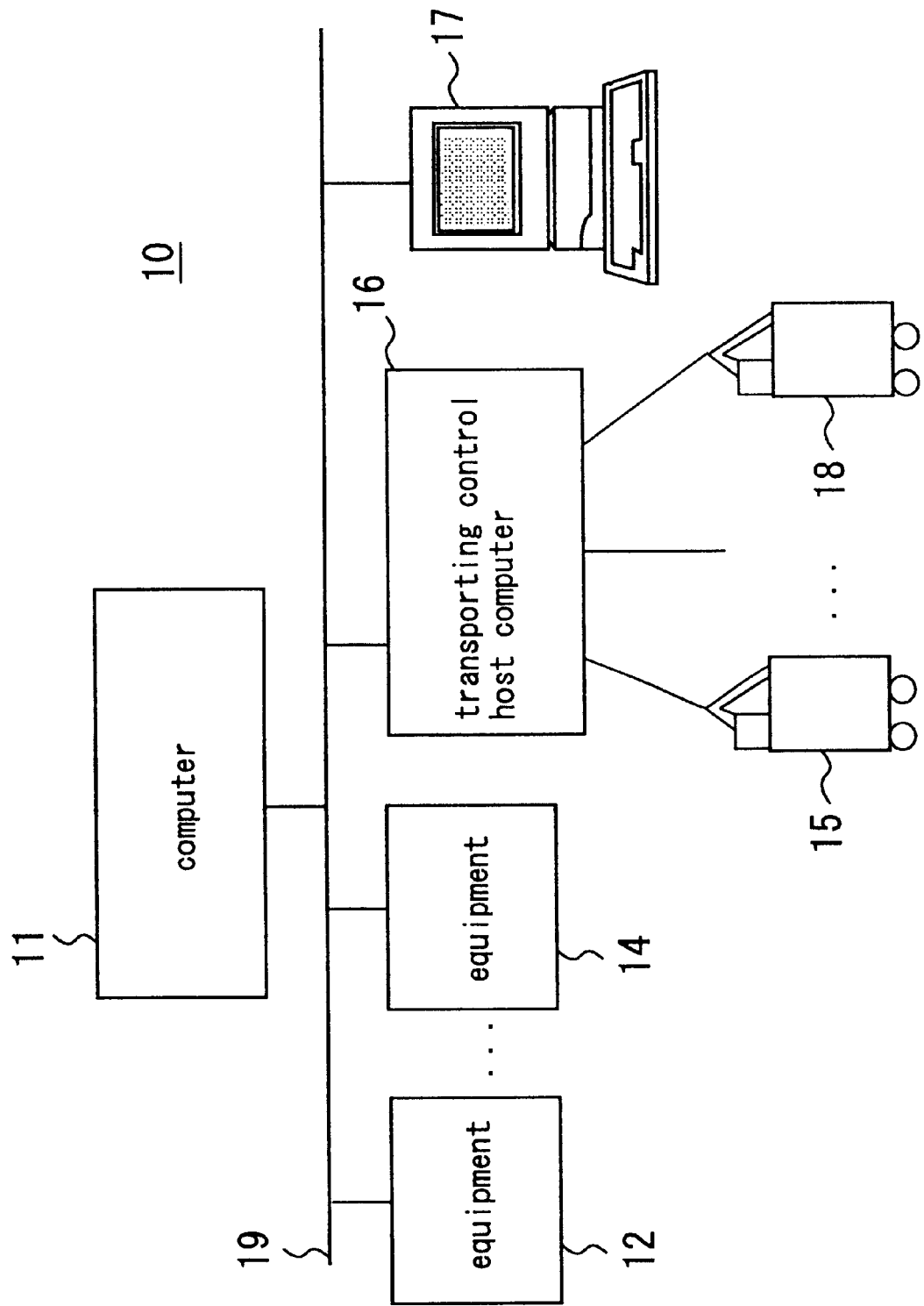
FIG. 1 shows a schematic constitution of the computer system embodying the process selecting system of the present invention.

Embodiments of the present invention will be described below with reference to the accompanying drawings. It is noted that the same reference symbols in the drawings denote the same or corresponding components.

The functions of a computer system embodying the process selecting system of the present invention will first be described briefly, and the embodiments of the present invention will next be described in detail referring to drawings.

FIG. 1 shows a schematic constitution of the computer system embodying the process selecting system of the present invention. In FIG. 1, reference character 10 denotes the computer system embodying the process selecting system of the present invention, reference character 11 denotes the computer executing the method for selecting processes according to the present invention, including memories (not shown) such as an ROM (read only memory) storing data required for processing, and an RAM (random access memory). Reference characters 15 to 18 denote lot transporting apparatuses or the like, reference character 16 denotes a transporting control host computer controlling the lot transporting apparatus 15 or the like, reference character 12 to 14 denote units of equipment executing other processes or the like, reference character 17 denotes a terminal device sending or receiving data or instructions to or from the computer 11, transporting control host computer 16 or equipment 12 or the like, reference character 19 denotes a bus connecting the computer 11, the transporting control host computer 16, equipment 12 or the like.

The process equipment selecting program of the present invention can be stored in recording media (not shown) such as CD-ROMs or FDs connected to the terminal device 17, the computer 11, the transporting control host computer 16, or the like. The process equipment selecting program stored in recording media such as CD-ROMs or FDs is executed by the computer 11 or the like.

Embodiment 1

The process equipment selecting system and method for acquiring equipment to be the candidate for processing the lot in Embodiment 1 of the present invention will be described below. The process equipment selection is executed when the retrieval of equipment is required such as when the process of the lot has progressed and when the renewal of process equipment is instructed by the operator.

Figure 2:
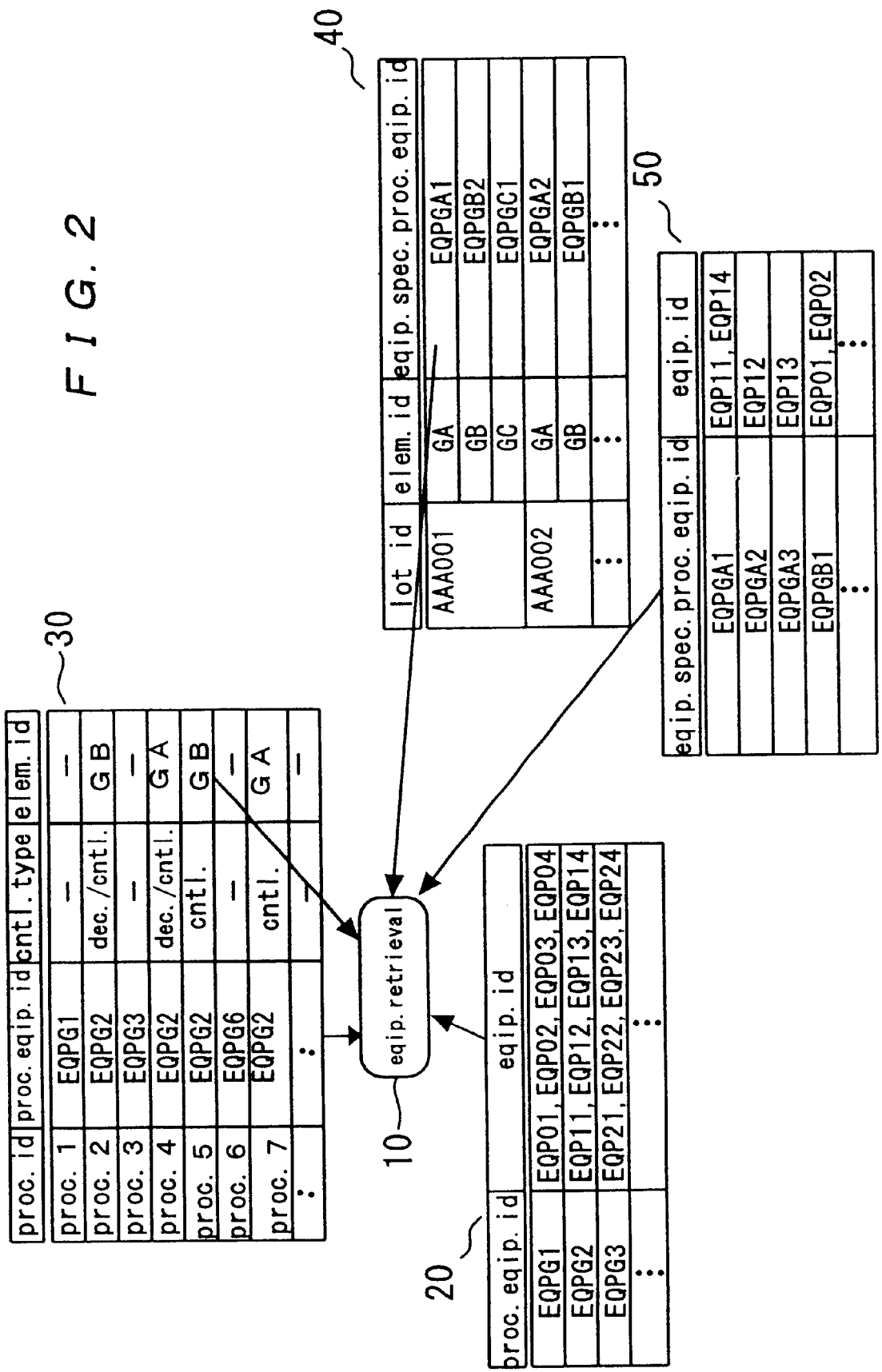
FIG. 2 shows the relationship between the processes for processing the lot in Embodiment 1 of the present invention and equipment used in those processes.

FIG. 2 shows the relationship between the processes for processing the lot in Embodiment 1 of the present invention and equipment used in those processes. In FIG. 2, the reference character 30 denotes a process master table (process master control means) defining the order of processes required for the production of the lot, which includes the process (proc.) id showing the order of processes to be processed, the process equipment (eqip.) id showing the group containing one or more units of equipment usable corresponding to the process id, the control (cntl.) type indicating whether control for specifying equipment used in the process id (hereafter referred to as "equipment-specific"), and the element (elem.) id which is the identified for executing a plurality of equipment-specific controls even in the case of one product type. For example, the process id is defined in the order of "process 1," "process 2," and "process 3." The process equipment id corresponds to each process id, and the process equipment id corresponding to "process 1" is defined as "EQPG 1." The control type is defined as "control" for the process id of "process 5," and in this case, the element id is defined as "GB." The element id can be divided in the unit of the element process or the like.

The reference character 40 denotes an equipment-specific lot information table (lot information control means) showing specific equipment for the lot, which contains the lot id assigned to each lot for identifying the lot or product to be processed, the element id which is the identifier determined by the process for performing a plurality of equipment-specific controls for a lot, and the process equipment id specific to equipment for identifying the equipment-specific (spec.) group of one or more units of equipment (equipment-specific process equipment group) similar to the lot id or the element id. For example, the lot id includes "AAA001," "AAA002," or the like, and the element id of which lot id is "AAA001" includes "GA," "GB," or "GC." The equipment-specific process equipment id of which lot id is "AAA001" and element id is "GA" is "EQPGA1."

The reference character 20 denotes the process equipment table (process equipment control means) defining the process equipment id, and the equipment id contained in the group of the process equipment id. The process equipment table 20 defines one or more equipment ids corresponding to the process equipment id, and the equipment identified by these equipment ids is the equipment actually usable in each process. For example, the process id "EQPG1" includes the units of equipment of which equipment ids are "EQP01," "EQP02," "EQP03," and "EQP04."

The reference character 50 denotes the equipment-specific process equipment table (equipment-specific process equipment control means) defining the equipment-specific process equipment id, and the equipment id contained in the group of the equipment-specific process equipment id. The equipment-specific process equipment table 50 defines one or more equipment ids corresponding to the equipment-specific process equipment id, and equipment identified by these equipment ids is equipment actually usable in each process. For example, equipment-specific process equipment id "EQPGA1" includes the units of equipment of which equipment ids are "EQP11" and "EQP14." The equipment-specific process equipment table 50 has the same constitution as the process equipment table 20. Therefore, in the case of the same process id, the equipment id in the equipment-specific process equipment table 50 has the relationship contained in the equipment id in the process equipment table 20.

Next, there is described the equipment selecting method for acquiring the candidate process equipment, when it is required to limit equipment usable for processing the lot in the next process step, as in the case where a lot has been processed in a process step and proceeds to the next process step.

Figure 3:
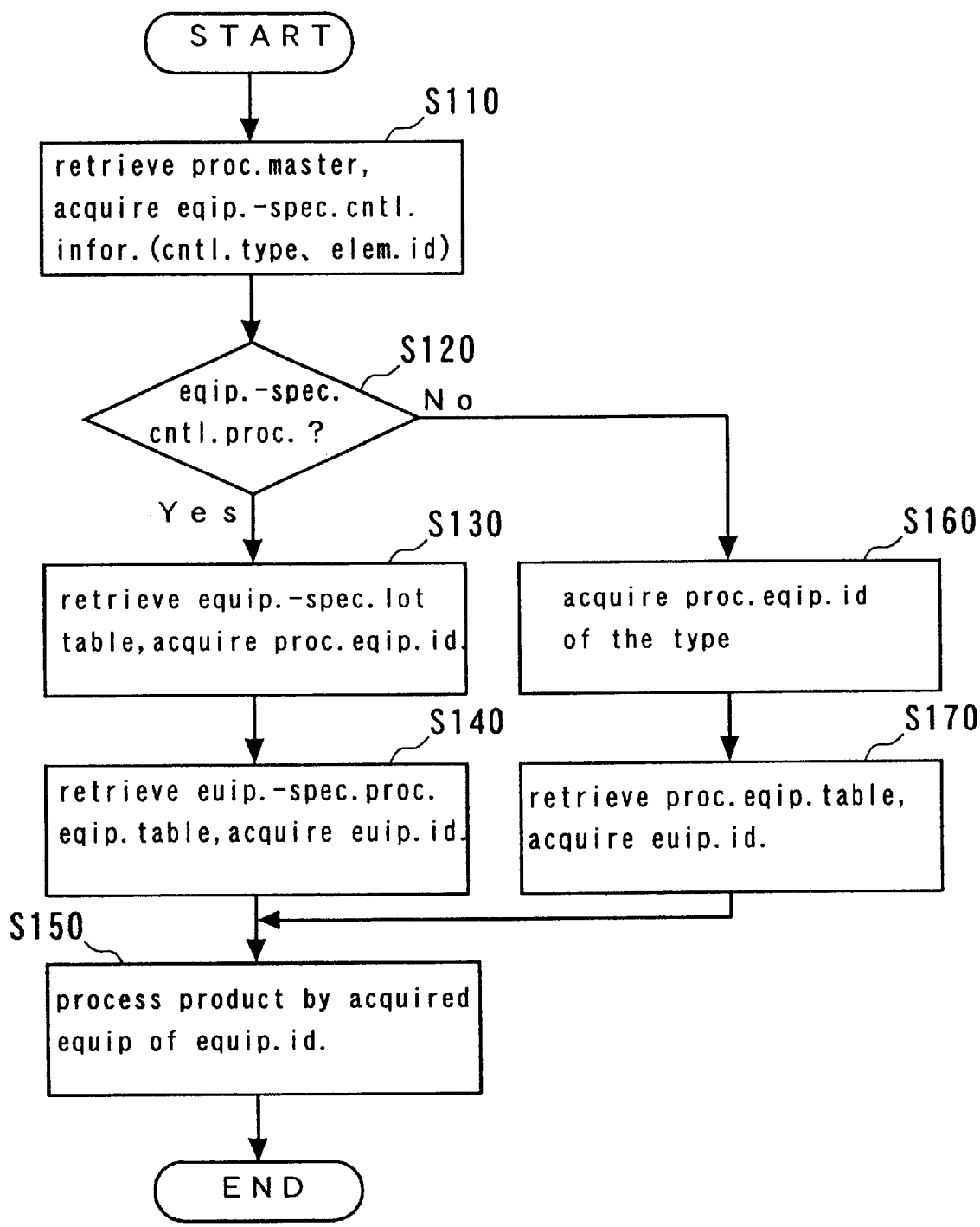
FIG. 3 is a flowchart showing the equipment selecting method in Embodiment 1 of the present invention when equipment usable for processing the lot in the next process step is acquired.

FIG. 3 is a flowchart showing the equipment selecting method in Embodiment 1 of the present invention when equipment usable for processing the lot in the next process step is acquired. As FIG. 3 shows, various control information (infor.) of the process master table 30 of the lot for selecting equipment is retrieved to acquire the control type and the element id of the next process id (Step S110). From the control type acquired in Step S110, whether the relevant process is the equipment-specific control process or not is determined (Step S120). When the process is determined to be the equipment-specific control process in Step S120, the equipment-specific lot information table 40 is retrieved to acquire the relevant lot id and also the equipment-specific process equipment id corresponding to the element id acquired in Step S130 (Step S130). The equipment-specific process equipment table 50 is retrieved using the equipment-specific process equipment id acquired in Step S130 to acquire the usable equipment id (Step S140). From one or more equipment id acquired in Step S140, a unit of equipment actually usable for processing the lot is selected, and the lot is actually processed by the selected unit of equipment (Step S150). When the process is determined not to be the equipment-specific control process in Step S120, various control information of the process master table 30 of the lot for selecting equipment is retrieved to acquire the process equipment id of the type of the relevant lot (Step S160). The process equipment table 20 is retrieved using the process equipment id acquired in Step S160 to acquire the usable equipment id (Step S170). From one or more equipment id acquired in Step S170, a unit of equipment actually usable for processing the lot is selected, and the lot is actually processed by the selected unit of equipment (Step S150).

According to Embodiment 1 as described above, since the optimal unit of equipment for each lot can be selected from the usable units of equipment, the lot can be processed using the specified unit of equipment. Furthermore, since a plurality of units of equipment can be specified for each lot, the unit of equipment can be specified by the equipment group having a plurality of units of equipment.

Embodiment 2

Figure 4:
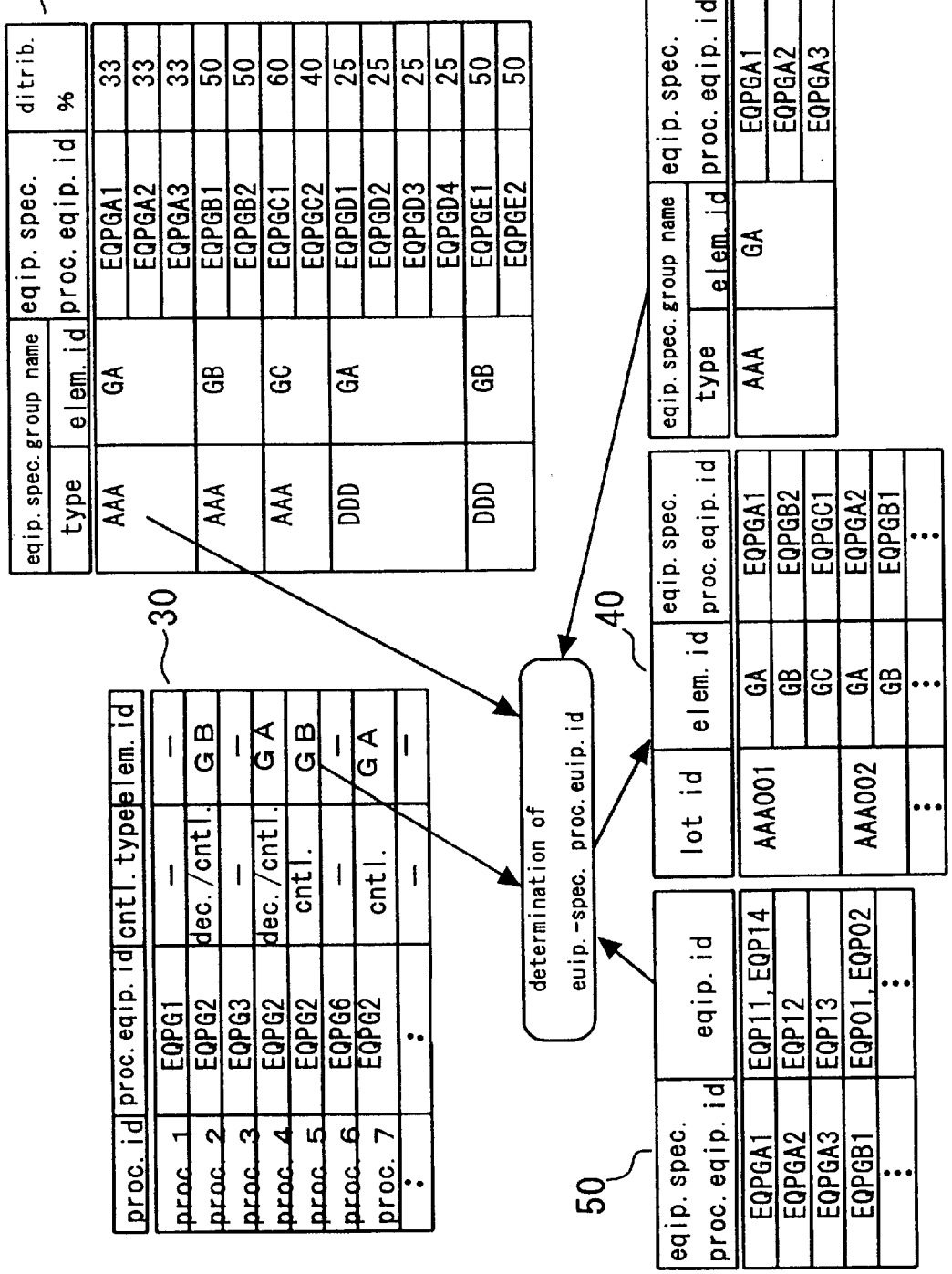
FIG. 4 shows a method for selecting process equipment when equipment-specific process equipment is determined for each lot according to Embodiment 2 of the present invention.

FIG. 4 shows a method for selecting process equipment when equipment-specific process equipment is determined for each lot according to Embodiment 2 of the present invention. In FIG. 4, since the tables having the same Reference character s as used in FIG. 2 have the same relationships as in FIG. 2, the description is omitted.

In FIG. 4, the reference character 60 denotes the equipment-specific control table (equipment-specific control means), which includes the equipment-specific group containing the type and the element id uniquely determined from the lot, the equipment-specific process equipment id for identifying a plurality of equipment-specific groups (equipment-specific process equipment groups) each having one or more unit of equipment for each equipment-specific group, and the distribution (distrib.) percentage for allocating the unit of equipment contained in a plurality of equipment-specific process equipment groups to the lots. The distribution percentage is a percentage defined for allocating the most adequate equipment-specific process equipment id among a plurality of equipment-specific process equipment ids in the same equipment-specific group to the lots, and the total of the distribution percentage for each equipment-specific group is 100%. For example, the equipment-specific group of which the type is "AAA" and the element id is "GB" contains two equipment-specific process equipment groups having "EQPGB1" and "EQPGB2" as equipment-specific process equipment ids. In this equipment-specific group, the distribution percentage of each of the two equipment-specific units of process equipment is 50%, and the total of distribution percentages of this equipment-specific group is 100%.

The reference character 70 shows the distribution state table (distribution state control means) which accumulates and control the distribution ratios converted from the distribution percentages shown by the equipment-specific control table 60, and the results of distribution, for each equipment-specific process equipment id of the equipment-specific group. The initial value of the results of distribution of the distribution state table 70 is 0. The equipment-specific process equipment id determined by the lot id and the element id is accumulated in the equipment-specific process equipment id column of the lot information table 40. Therefore, the state of the equipment-specific process equipment id used for the current lot id and element id is known and controlled by the distribution state table 40.

Figure 5:
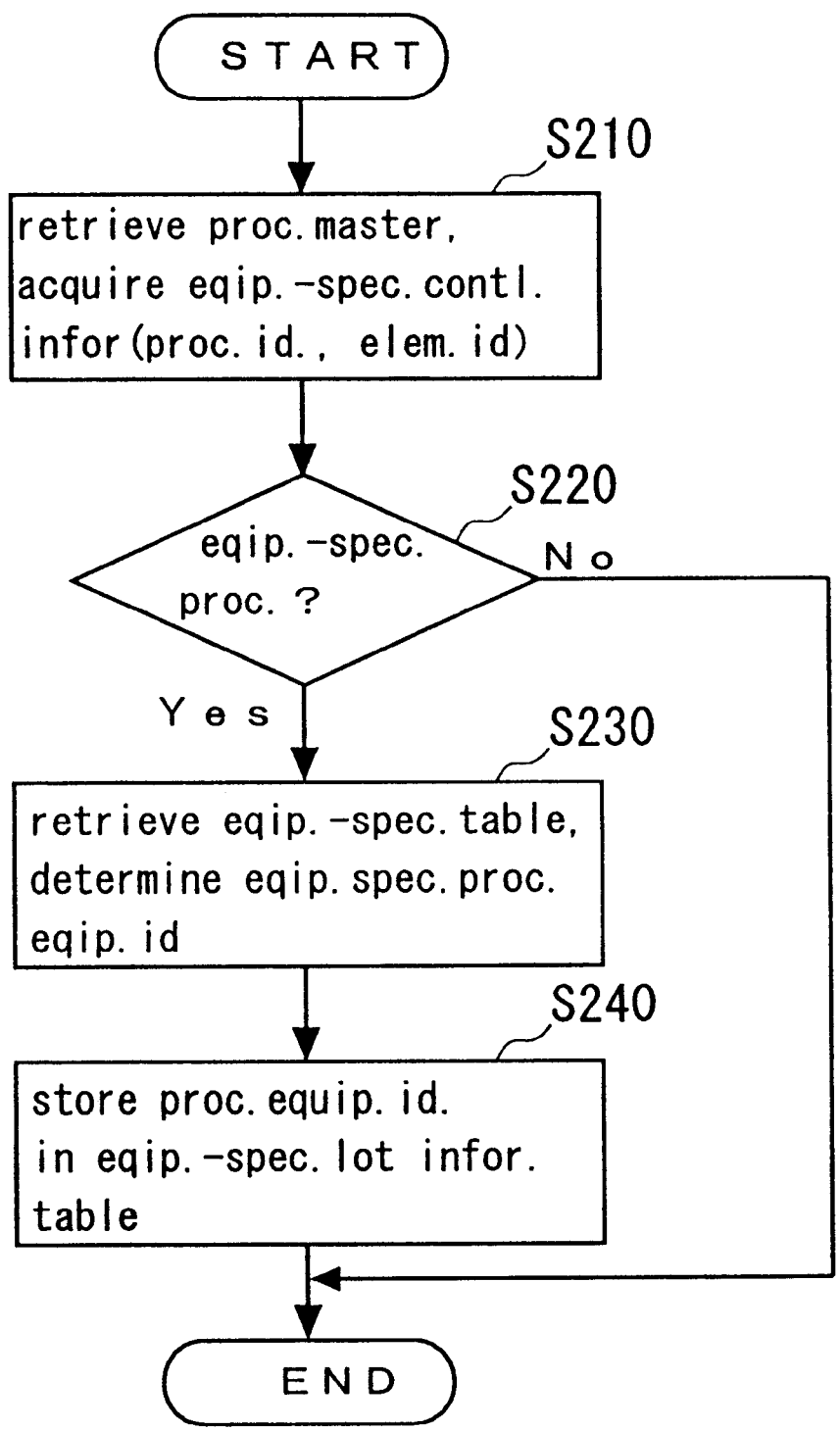
FIG. 5 is a flowchart showing the method for determining candidate equipment of each lot, when equipment usable for processing the lot in the next process step according to Embodiment 2 of the present invention.

FIG. 5 is a flowchart showing the method for determining candidate equipment of each lot, when equipment usable for processing the lot in the next process step according to Embodiment 2 of the present invention. As FIG. 5 shows, various control information for selecting equipment in the process master table 30 of the lot is first retrieved to acquire the control type of the next process id and the element id (Step S210). From the control type acquired in Step S210, whether or not the present process is the equipment-specific determination process is determined (Step S220). When the process is determined to be the equipment-specific determination process in Step S220, the equipment-specific control table 60 is retrieved to acquire a plurality of equipment-specific process equipment ids corresponding to the type of the lot id and also the element id of acquired in Step S210. From the acquired plurality of equipment-specific process equipment ids, the equipment-specific process equipment id most suitable for the present lot is determined (Step S230).

The equipment-specific process equipment id determined in Step S230 is stored in the equipment-specific lot information table 40 (Step S240). When the process is determined not to be the equipment-specific determination process in Step S220, Steps S230 and 240 are not executed, and the determination process is ended. The determination of the most suitable equipment-specific process equipment id in Step S230 will be described in the description of Embodiment 3 and 4 below.

According to Embodiment 2, as described above, the equipment-specific group specifying equipment can be determined automatically by this system. Furthermore, as described in Embodiments 1 or 2, equipment-specific control can be performed only in the processing stage required for a product or a lot by specifying equipment-specific control to the process id of the process master table 30.

The determination of whether or not the present process is the equipment-specific determination process in Step S120 of the above-described Embodiment 1 (FIG. 3), and the determination of whether or not the present process is the equipment-specific determination process in Step S220 of Embodiment 2 (FIG. 4) can be performed collectively. In the case of the equipment-specific control process, Steps S130, 140, and 150 shown in FIG. 3 can be executed; in the case of the equipment-specific determination process, Steps S230 and S240 shown in FIG. 5 can be executed; in the case of the equipment-specific control process and also the equipment-specific determination process, Steps S230 and S240 shown in FIG. 5 can be executed before Steps S130, 140, and 150 shown in FIG. 3 are executed; and when the process is neither the equipment-specific control process nor the equipment-specific determination process, Steps S160 and S170 shown in FIG. 3 can be executed.

Embodiment 3

FIG. 6 shows a method for determining equipment-specific process equipment id according to Embodiment 3 of the present invention. Embodiment 3 is an example of the most adequate methods for determining equipment-specific process equipment id in Step S230 for the above-described Embodiment 2 (FIG. 5). As FIG. 6 shows, a plurality of equipment-specific process equipment ids of the same product type and having the same element id is collected into an equipment-specific group. Next, for the lots in the production line, equipment-specific process equipment ids within this equipment-specific group are collected from the equipment-specific lot information table 40, and the number of the lots in process (Ni, i=1 . . . n, n=the number of ids) is counted for each equipment-specific process equipment id (calculation means for the number of the lots in process). The collected number of the lots in process for each equipment-specific process equipment id is corrected as required (Step S310). The distribution percentages for each equipment-specific process equipment id in the above-described equipment-specific group (ri, i=1 . . . n) is acquired from the equipment-specific control table 60 (Step S320, distribution percentage acquiring means). The adequate number of the products in process for each equipment-specific process equipment id (ni, i=1 . . . n) is calculated based on the distribution percentages ri (Step S330, calculation means for the adequate number of the products in process). This adequate number of the products in process ni can be obtained, for example by the following equation (1) adequate number of the products in process.

$$ni = ri \bigg/ \left(100 \times \sum_{i=1}^{n} Ni\right) \quad (1)$$

The differential Gi between the adequate number of the products in process ni obtained from equation (1) or the like and the actual number of the products in process is obtained as shown in equation (2).

$$Gi = ni - Ni \quad (2)$$

This Gi is made the priority degree of the equipment-specific process equipment ids in the present process step (Step S340, priority degree calculating means). The highest priority degree G is obtained from equation 3 by comparing the priority degrees Gi of the equipment-specific process equipment id of each unit of equipment, and this highest priority degree G is determined as the equipment-specific process equipment id of the present lot (Step S350, determination means).

$$G = \max(Gi) \quad (3)$$

The distribution percentage ri can be obtained, for example, by collectively calculating the number of registered units of equipment of one equipment-specific group, the equipment operating conditions or the quality state, the maintenance plan, and the number of the objective lots planned for production.

According to Embodiment 3 as described above, the number of the number of the products in process (Ni, i=1 . . . n, n=the number of ids) for each equipment-specific process equipment id can be obtained by collecting equipment-specific process equipment ids in the equipment-specific group for the lot in the production line. The adequate number of the products in process for each equipment-specific process equipment id (ni, i=1 . . . n) can be calculated based on the distribution percentages ri. The equipment having the largest differential Gi between this adequate number of the products in process ni and the collected actual number of the products in process can be determined as the equipment-specific process equipment of the present lot.

Embodiment 4

Embodiment 4 is another example of methods for determining the most suitable equipment-specific process equipment id in Step S230 of the above-described Embodiment 2 (FIG. 5). As the equipment-specific distribution state table 70 shows, distribution ratios calculated based on the distribution percentage ri of each equipment-specific control table 60 and distribution results are determined for the product type, the element id, and the equipment-specific process equipment id. For one equipment-specific group of the same product type and indicated by the same element id, the distribution percentage ri of each equipment-specific process equipment id is converted to respective integer ratio, and registered as the distribution ratio of the equipment-specific distribution state table 70. The initial value of the distribution results is made 0. The equipment-specific distribution state table 70 is prepared at the same time of registration for the equipment-specific control table 60. When it is required to specify the equipment usable in the next process step for each lot, the equipment-specific distribution state table 70 of the equipment-specific group meeting the product type of the lot and the element id of the process step is retrieved, and the distribution ratio and the distribution result are acquired. Respective distribution ratio is compared with the distribution result for each of a plurality of equipment-specific process equipment ids, and the equipment-specific process equipment id of which the distribution result has not reached the distribution ratio is made the equipment-specific process equipment id of the present lot. At the same time, the determined equipment-specific process equipment id is added to the distribution result. When the distribution result of each equipment-specific process equipment id has been the same as the respective distribution ratio in the same equipment-specific group, the distribution result is returned to the initial value.

According to Embodiment 4 as described above, by comparing respective distribution ratio with the distribution result for each of a plurality of equipment-specific process equipment ids, the equipment-specific process equipment id of which the distribution result has not reached the distribution ratio can be made the equipment-specific process equipment id of the present lot. Therefore, the equipment-specific process equipment id of the lot can be determined by the simpler method than the method of Embodiment 3.

Embodiment 5

Figure 7:
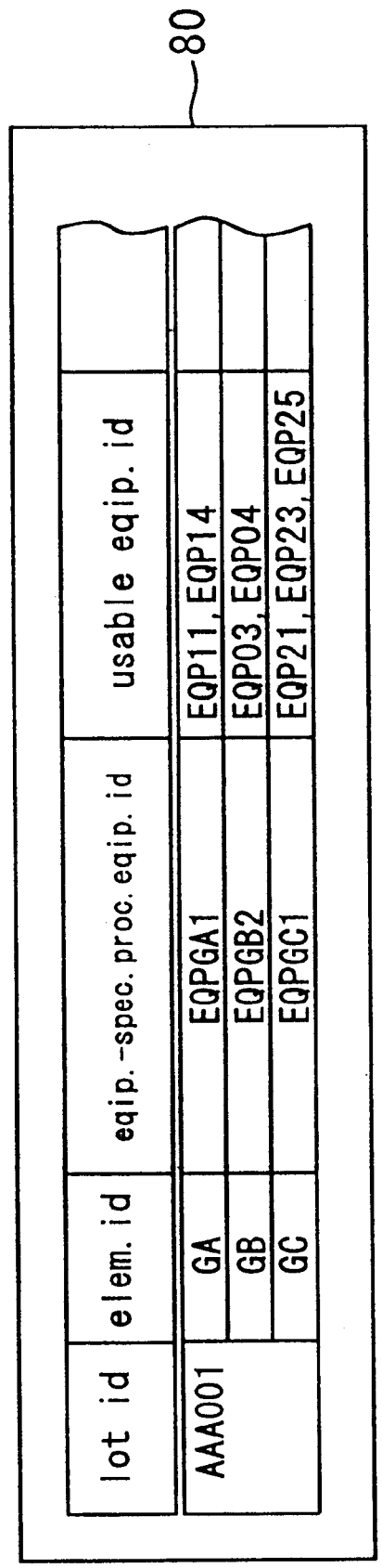
FIG. 7 shows a method for indicating and modifying the equipment group specified for each product or each lot in Embodiment 5 of the present invention.
Figure 9:
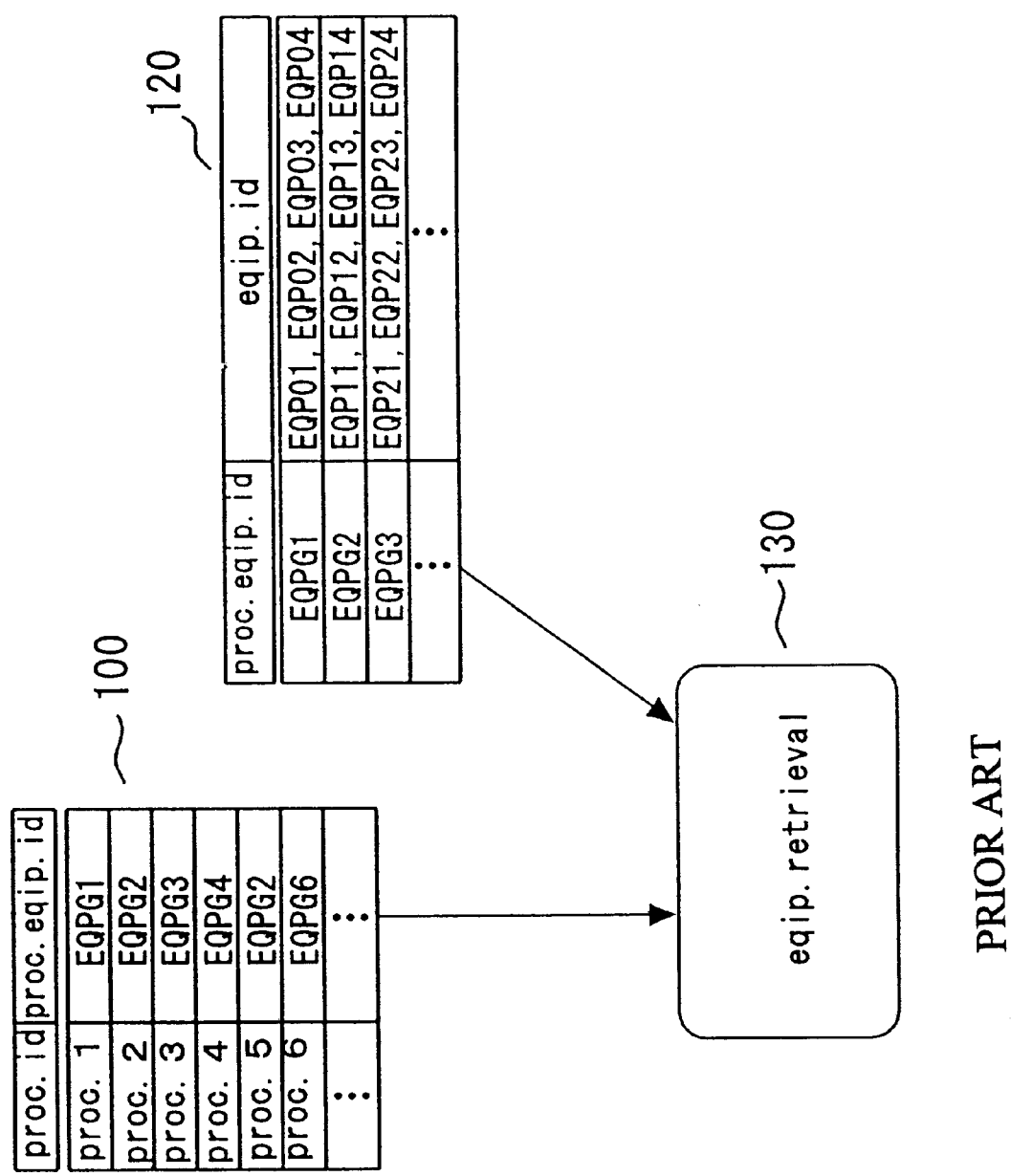
FIG. 9 shows the relationship between the process and equipment used in a conventional production factories.
Figure 10:
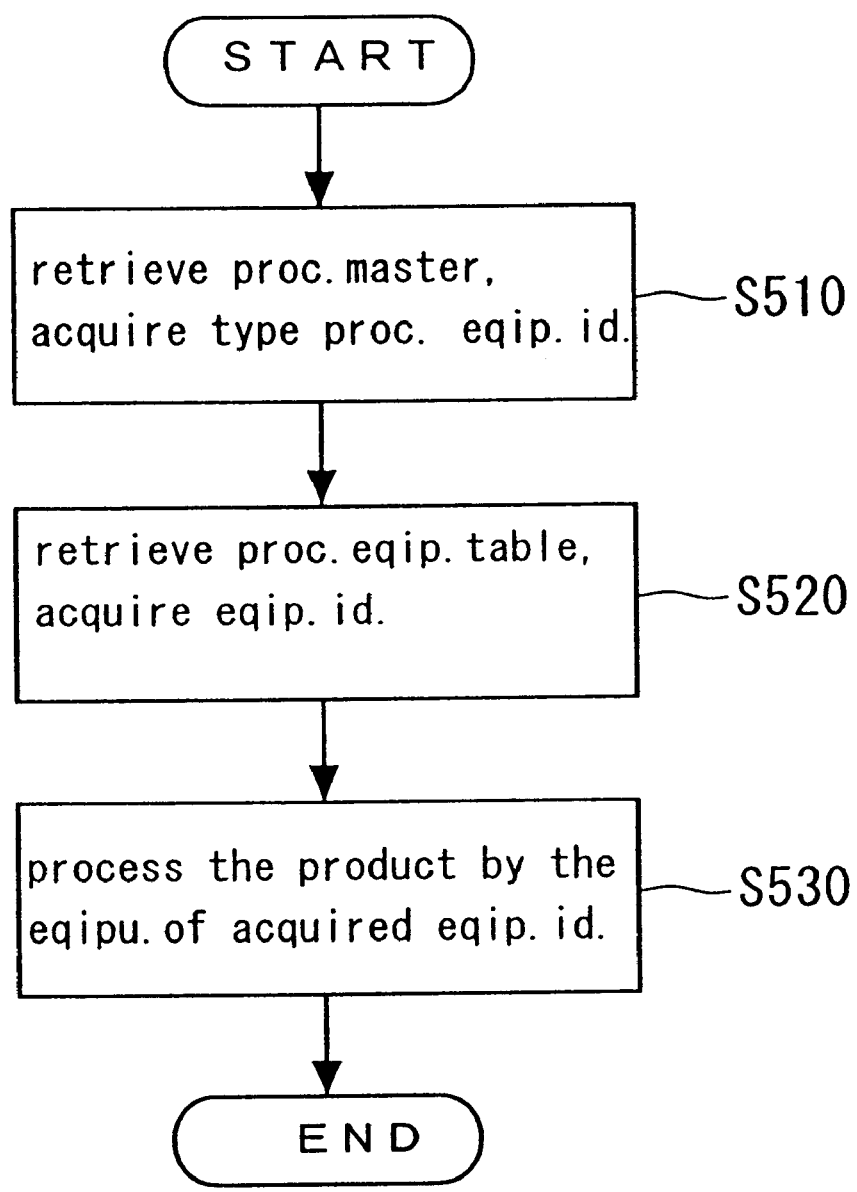
FIG. 10 is a flowchart showing a conventional equipment retrieving process for obtaining equipment which can be used for processing in the next process step when a certain process step of a lot has completed and proceeds to the next process step.

FIG. 7 shows a method for indicating and modifying the equipment group specified for each product or each lot in Embodiment 5 of the present invention. In FIG. 7, reference character 80 denotes the lot information display image showing an example displaying equipment-specific lot information, which can be produced based on the equipment-specific lot information table 70 and the equipment-specific process equipment table 50 (lot information displaying means). As FIG. 7 shows, the lot information display image 80 can display the equipment-specific process equipment id corresponding to each registered element id, the usable equipment id, or the like for each lot id. For example, three element ids "GA," "GB," and "GC" are displayed, and when the element id is "GA," "EQPGA1" is displayed as the equipment-specific process equipment id, and "EQP11," "EQP14," or the like are displayed as usable equipment ids for this equipment-specific process equipment id. Thus, the equipment group specified for each lot can be displayed.

By specifying a lot id and an element id, and establishing the equipment-specific process equipment id, the equipment id specifying the use can be modified. In the same manner, an equipment-specific process equipment id can be added or removed (process equipment changing means).

FIG. 8 shows a method for displaying usable equipment ids or the like for each equipment-specific group in Embodiment 5 of the present invention. In FIG. 8, reference character 90 denotes the equipment-specific control table displaying image showing an example for displaying usable equipment ids or the like for each equipment-specific group, which can be prepared based on the equipment-specific process equipment table 50, equipment-specific control table 60, equipment-specific distribution state table 70, or the like (control information displaying means). As FIG. 8 shows, the equipment-specific control table displaying image 90 can display the usable equipment id, distribution percentage ri, the number of actual lots, or the like for each product type, element id, and equipment-specific process equipment id. In the equipment-specific lot information displaying image 80 shown in FIG. 7, the control table displaying image 90 of FIG. 8 can be referred to when an equipment-specific process equipment id is modified.

According to Embodiment 5 as described above, equipment groups specified for each lot can be displayed. Furthermore, an equipment id for specified use can be changed, and an equipment-specific process equipment id can be added or removed. Equipment ids usable for each equipment-specific group can also be displayed.

Embodiment 6

Embodiment 6 of the present invention is a method for determining/controlling equipment-specific control specifying equipment to be used for each lot in the other equipment group for each specific process step.

The method for performing equipment-specific control using a plurality of different equipment groups of the same product type can be executed by using the above-described element id (element process changing means). The element id is the identifier for enabling to have different equipment-specific process equipment ids of the same product type as described above. Embodiment 6 is the same as the above-described Embodiments 1 or 2 except that the value of the element id for the process id specified in the process master table 30. By using different element id of the equipment-specific control table 60 referred when the equipment group (equipment-specific process equipment id) is determined, or equipment-specific lot information table 50 in which the equipment-specific process equipment id is written, different equipment-specific process equipment ids can be held. Furthermore, by using different element ids of the equipment-specific lot information table 40 referred when the equipment group is controlled, control is performed by the equipment registered in different equipment-specific process equipment ids.

As shown in the process master table 30 in FIGS. 2 and 4, since process steps 2, 4, 5, and 7 have the same process equipment id (EQPG2), the same equipment is selected for each product or each product type. However, when equipment-specific control is performed using different element ids, different units of equipment can be selected. When no equipment-specific control is performed, since the process equipment id is EQPG2 for all process steps, the unit of equipment for processing is selected from EQP11, EQP12, EQP13, or EQP14 in the process equipment table 20. For example, when the element id of the process steps 2 and 5 of the lot of which the lot id the is AAA002 is GB, and element id of the process steps 4 and 7 is GA, using the lot information table 40 and the equipment-specific process equipment table 50, the equipment of which the equipment id is EQP01 or EQP02 is used in the process steps 2 and 5, and the equipment of which the equipment id is EQP12 is used in the process steps 4 and 7. It is effective, for example, when the manufacturing process includes the process step in the X-axis direction and the process step in the Y-axis direction, and higher accuracy is required between the process steps in the same direction than the accuracy between the X-axis direction and the Y-axis direction.

According to Embodiment 6 as described above, equipment-specific specifying equipment used in each lot can be determined/controlled by the other equipment group for each process step.

Embodiment 7

Embodiment 7 of the present invention is a method for conveying lots by selecting equipment for processing from the equipment-specific equipment group for each lot. The lots can be conveyed automatically using a conventional method for automatic conveying control, by using the equipment group.

When a lot is automatically conveyed, the destination equipment is registered in the conveying control host computer, thereby the lot is automatically conveyed to the object equipment. In conventional automatic conveying control, the destination equipment is a unit of equipment selected from the units of equipment registered in one or more equipment ids acquired in Step S170 of FIG. 3. According to Embodiment 7, however, the destination equipment can be a unit of equipment selected from the equipment id acquired by retrieving the equipment-specific process equipment table 50 explained in the step S140 shown in FIG. 3 (conveying destination selecting means).

According to Embodiment 7 as described above, since the destination equipment to which a lot is conveyed can be a unit of equipment selected from the equipment id acquired by retrieving the equipment-specific process equipment table 50, the lot can be conveyed automatically using a conventional method for automatic conveying control.

According to the process selection system and method of the present invention as described above, a lot of a product type can be processed by any unit of equipment among a plurality of units of equipment, whereas when processing specified to the most suitable unit of equipment for each lot is required, this specified unit of equipment can be used for processing by selecting the unit of equipment most suitable for each lot from the units of equipment usable for the product type. Furthermore, since a plurality of units of equipment which can be specified for each lot can be established, the equipment can be specified by the equipment group having a plurality of units of equipment. As a result, the process selection system and method which can automatically control the specification of the most suitable equipment can be provided.

Here, the process equipment selection system may further comprise a process equipment control means controlling the process equipment included in the process equipment group for each of the process equipment groups, wherein when the control type of the process master control means does not indicate controlling the specification of process equipment used for producing the lot, a process equipment group is acquired from the process master control means, and the process equipment included in the process equipment group is selected from the process equipment control means.

In the process equipment selection system, the control type controlled by the process master control means may further comprise the type indicating whether or not the specification of process equipment used in the process is determined; the process equipment selection system further comprising: an equipment-specific control means controlling for each lot and each element process of the lot a plurality of equipment-specific process equipment control groups used in the element process, and a distribution percentage for allocating process equipment included in the plurality of equipment-specific process equipment control groups; and an equipment-specific process equipment group determining means acquiring a plurality of equipment-specific process equipment groups from the equipment-specific control means when the control type of the process master control means indicates the specification of process equipment used for producing the lot, and determining one equipment-specific process equipment group from a plurality of acquired equipment-specific process equipment groups, wherein the determined equipment-specific process equipment group is made the equipment-specific process equipment group within the lot information control means.

In the process equipment selection system, the equipment-specific process equipment group determination means may comprise: an means for calculating the number of products in process for collecting an equipment-specific process equipment group corresponding to the lot in process and the element process of the lot from the lot information control means, and obtaining the number of products in process for each of the equipment-specific process equipment group; a distribution percentage acquiring means for acquiring distribution percentage for each equipment-specific process equipment group from the equipment-specific control means; an means for calculating the adequate number of products in process for obtaining the adequate number of products in process for each equipment-specific process equipment group based on the distribution percentage acquired by the distribution percentage acquiring means; an means for calculating the priority degree for obtaining the priority degree for each equipment-specific process equipment group based on the differential between the adequate number of products in process obtained by the means for calculating the adequate number of products in process and the number of products in process obtained by the means for calculating the number of products in process; and a determination means for comparing the priority degree of each equipment-specific process equipment group obtained by the means for calculating the priority degree, and determining the equipment-specific process equipment group for the lot.

In the process equipment selection system, the equipment-specific process equipment group determination means may further comprise for each lot and each element process of the lot, corresponding to each of a plurality of equipment-specific process equipment groups used in the element process, an equipment-specific distribution state control means for controlling the distribution ratio allocating the process equipment in the equipment-specific process equipment group to the lot and the distributed actual value, wherein when the control type of the process master control means indicates controlling the specification of process equipment used for producing the lot, the corresponding distribution ratio and distribution result are acquired from the the equipment-specific distribution state control means, and the equipment-specific process equipment group in which the distribution result has not reached the distribution ratio is made the equipment-specific process equipment group for the lot.

Here, the process equipment selection system may further comprise, based on the equipment-specific lot information control means and the equipment-specific process control means, for each lot, a lot information display means for displaying the process equipment included in the element process, the equipment-specific process equipment group corresponding to the element process, and the equipment-specific process equipment group for each lot, based on the equipment-specific lot information control means and the equipment-specific process equipment control means.

Here, the process equipment selection system may further comprise, based on the equipment-specific control means, the equipment-specific process equipment control means and the equipment-specific distribution state control means for each lot, a control information display means for displaying the distribution ratio and the distribution result corresponding to the element process, a plurality of equipment-specific process equipment groups corresponding to the element process, the process equipment included in the plurality of equipment-specific process equipment groups, and the plurality of equipment-specific process equipment groups.

Here, the process equipment selection system may further comprise a process equipment modifying means for designating the element process and the equipment-specific process equipment group corresponding the element process for each lot, and modifying process equipment included in the designated equipment-specific process equipment group.

Here, the process equipment selection system may further comprise an element process modifying means for modifying the element process which the process controlled by the process master control means can include.

Here, the process equipment selection system may further comprise a conveying destination selection means for selecting process equipment included in the equipment-specific process equipment group selected from the equipment-specific process equipment control means for each lot, or process equipment included in the process equipment group selected from the process equipment control means for each lot, as the process equipment for conveying the lot.

In the method for selecting process equipment, the process equipment selection system may further comprise a process equipment control portion for controlling the process equipment included in the process equipment group for each of the process equipment groups, and the method for selecting process equipment comprises, when the control type of the process master control portion does not indicate controlling the specification of process equipment for producing the lot,: a process equipment acquiring step for acquiring a process equipment group from the process master control portion; and a selection step for selecting the process equipment included in the process equipment group acquired by the process equipment acquiring step from the process equipment control portion.

The present invention has been described in detail with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

The entire disclosure of Japanese Patent Application No. 11-345418 filed on Dec. 3, 1999 including specification, claims, drawings and summary are incorporated herein by reference in its entirety.

What is claimed is:

1. A process equipment selection system for selecting process equipment for each lot, comprising:
   a process master control means for controlling the order of process steps producing the lot, together with a process equipment group including at least one unit of equipment used for said process, a control type showing whether or not the specification of process equipment used for said process is controlled, and an element process that said process can include;
   a lot information control means for controlling an equipment-specific process equipment group including at least one unit of process equipment most suitable for element process for each lot and the element process of said lot; and
   an equipment-specific process equipment control means controlling the process equipment included in equipment-specific process equipment group for each of said equipment-specific process equipment groups,
   wherein when the control type of said process master control means indicates controlling the specification of process equipment for producing the lot, an equipment-specific process equipment group specifically used is acquired from said lot information control means, and the process equipment included in said equipment-specific process equipment group is selected from said equipment-specific process equipment control means.

2. The process equipment selection system according to claim 1, further comprising a process equipment control means controlling the process equipment included in said process equipment group for each of said process equipment groups, wherein when the control type of said process master control means does not indicate controlling the specification of process equipment used for producing the lot, a process equipment group is acquired from said process master control means, and the process equipment included in said process equipment group is selected from said process equipment control means.

3. The process equipment selection system according to claim 2, further comprising an element process modifying means for modifying the element process which the process controlled by said process master control means can include.

4. The process equipment selection system according to claim 1, wherein:
   the control type controlled by said process master control means further comprises the type indicating whether or not the specification of process equipment used in the process is determined;
   said process equipment selection system further comprising:
   an equipment-specific control means controlling for each lot and each element process of said lot a plurality of equipment-specific process equipment control groups used in said element process, and a distribution percentage for allocating process equipment included in said plurality of equipment-specific process equipment control groups; and
   an equipment-specific process equipment group determining means acquiring a plurality of equipment-specific process equipment groups from said equipment-specific control means when the control type of said process master control means indicates the specification of process equipment used for producing the lot, and determining one equipment-specific process equipment group from a plurality of acquired equipment-specific process equipment groups,
   wherein the determined equipment-specific process equipment group is made the equipment-specific process equipment group within said lot information control means.

5. The process equipment selection system according to claim 4, wherein said equipment-specific process equipment group determination means comprises:
   a means for calculating the number of products in process for collecting an equipment-specific process equipment group corresponding to the lot in process and the element process of said lot from said lot information control means, and obtaining the number of products in process for each of said equipment-specific process equipment group;
   a distribution percentage acquiring means for acquiring distribution percentage for each equipment-specific process equipment group from said equipment-specific control means;
   a means for calculating the adequate number of products in process for obtaining the adequate number of products in process for each equipment-specific process equipment group based on the distribution percentage acquired by said distribution percentage acquiring means;
   a means for calculating the priority degree for obtaining the priority degree for each equipment-specific process equipment group based on the differential between the adequate number of products in process obtained by said means for calculating the adequate number of products in process and the number of products in process obtained by said means for calculating the number of products in process; and a determination means for comparing the priority of each equipment-specific process equipment group obtained by said means for calculating the priority degree, and determining the equipment-specific process equipment group for said lot.

6. The process equipment selection system according to claim 5, further comprising an element process modifying means for modifying the element process which the process controlled by said process master control means can include.

7. The process equipment selection system according to claim 4, wherein said equipment-specific process equipment group determination means further comprises for each lot and each element process of said lot, corresponding to each of a plurality of equipment-specific process equipment groups used in said element process, an equipment-specific distribution state control means for controlling the distribution ratio allocating the process equipment in the equipment-specific process equipment group to the lot and the distributed actual value, wherein when the control type of said process master control means indicates controlling the specification of process equipment used for producing the lot, the corresponding distribution ratio and distribution result are acquired from the said equipment-specific distribution state control means, and the equipment-specific process equipment group in which said distribution result has not reached said distribution ratio is made the equipment-specific process equipment group for the lot.

8. The process equipment selection system according to claim 7, further comprising, based on said equipment-specific control means, said equipment-specific process equipment control means and said equipment-specific distribution state control means, for each lot, a control information display means for displaying the distribution ratio and the distribution result corresponding to the element process, a plurality of equipment-specific process equipment groups corresponding to said element process, the process equipment included in said plurality of equipment-specific process equipment groups, and said plurality of equipment-specific process equipment groups.

9. The process equipment selection system according to claim 8, further comprising a process equipment modifying means for designating the element process and the equipment-specific process equipment group corresponding said element process for each lot, and modifying process equipment included in said designated equipment-specific process equipment group.

10. The process equipment selection system according to claim 9, further comprising an element process modifying means for modifying the element process which the process controlled by said process master control means can include.

11. The process equipment selection system according to claim 8, further comprising an element process modifying means for modifying the element process which the process controlled by said process master control means can include.

12. The process equipment selection system according to claim 7, further comprising an element process modifying means for modifying the element process which the process controlled by said process master control means can include.

13. The process equipment selection system according to claim 1, further comprising, based on said equipment-specific lot information control means and said equipment-specific process control means, for each lot, a lot information display means for displaying the process equipment included in the element process, the equipment-specific process equipment group corresponding to said element process, and said equipment-specific process equipment group for each lot, based on said equipment-specific lot information control means and said equipment-specific process equipment control means.

14. The process equipment selection system according to claim 13, further comprising a process equipment modifying means for designating the element process and the equipment-specific process equipment group corresponding said element process for each lot, and modifying process equipment included in said designated equipment-specific process equipment group.

15. The process equipment selection system according to claim 14, further comprising an element process modifying means for modifying the element process which the process controlled by said process master control means can include.

16. The process equipment selection system according to claim 13, further comprising an element process modifying means for modifying the element process which the process controlled by said process master control means can include.

17. The process equipment selection system according to claim 1, further comprising an element process modifying means for modifying the element process which the process controlled by said process master control means can include.

18. The process equipment selection system according to claim 1, further comprising a conveying destination selection means for selecting process equipment included in the equipment-specific process equipment group selected from said equipment-specific process equipment control means for each lot, or process equipment included in the process equipment group selected from said process equipment control means for each lot, as the process equipment for conveying said lot.

19. A method for selecting process equipment in a process equipment selection system for selecting process equipment for each lot, said process equipment selection system comprising:

a process master control portion for controlling the order of process steps producing the lot, together with a process equipment group including at least one unit of equipment used for said process, a control type showing whether or not the specification of process equipment used for said process is controlled, and an element process that said process can include;

a lot information control portion for controlling an equipment-specific process equipment group including at least one unit of process equipment most suitable for element process for each lot and the element process of said lot; and an equipment-specific process equipment control means controlling the process equipment included in equipment-specific process equipment group for each of said equipment-specific process equipment groups, said method for selecting process equipment comprising:

an equipment-specific process equipment acquiring step for acquiring an equipment-specific process equipment group specifically used from said lot information control portion, when the control type of said process master control portion indicates controlling the specification of process equipment for producing the lot; and a selection step for selecting the process equipment included in said equipment-specific process equipment group acquiring step from the equipment-specific process equipment control portion.

20. The method for selecting process equipment according to claim 19, wherein said process equipment selection system further comprises a process equipment control portion for controlling the process equipment included in said process equipment group for each of said process equipment groups, and said method for selecting process equipment comprises: when the control type of said process master control portion does not indicate controlling the specification of process equipment for producing the lot, a process equipment acquiring step for acquiring a process equipment group from said process master control portion; and a selection step for selecting the process equipment included in said process equipment group acquired by said process equipment acquiring step from the process equipment control portion.

* * * * *